US006993759B2

(12) United States Patent
Aptus et al.

(10) Patent No.: US 6,993,759 B2
(45) Date of Patent: *Jan. 31, 2006

(54) DIAGRAMMATIC CONTROL OF SOFTWARE IN A VERSION CONTROL SYSTEM

(75) Inventors: Alexander Aptus, Esslingen (DE); Dietrich Charisius, Stuttgart (DE); Peter Coad, Raleigh, NC (US)

(73) Assignee: Borland Software Corporation, Cupertino, CA (US)

( * ) Notice: Subject to any disclaimer, the term of this patent is extended or adjusted under 35 U.S.C. 154(b) by 732 days.

This patent is subject to a terminal disclaimer.

(21) Appl. No.: 09/838,580

(22) Filed: Apr. 20, 2001

(65) Prior Publication Data

US 2002/0116702 A1  Aug. 22, 2002

Related U.S. Application Data

(63) Continuation-in-part of application No. 09/680,063, filed on Oct. 4, 2000.

(60) Provisional application No. 60/199,046, filed on Apr. 21, 2000, provisional application No. 60/157,826, filed on Oct. 5, 1999.

(51) Int. Cl.
  *G06F 9/44* (2006.01)
(52) U.S. Cl. ............. 717/170; 717/106; 717/109; 717/114; 717/108; 717/113; 707/500.1
(58) Field of Classification Search .......... 717/120, 717/122, 123, 104, 105, 107–108, 110, 114, 717/176, 106, 109, 133, 170; 707/13, 500.1; 34/339
See application file for complete search history.

(56) References Cited

U.S. PATENT DOCUMENTS

| 5,699,310 A | * | 12/1997 | Garloff et al. ............ 717/108 |
| 5,790,863 A | * | 8/1998 | Simonyi ................... 717/113 |
| 5,999,729 A | * | 12/1999 | Tabloski et al. .......... 717/105 |
| 6,289,513 B1 | * | 9/2001 | Bentwich ................. 717/106 |
| 6,369,778 B1 | * | 4/2002 | Dockery ................... 343/895 |
| 6,523,027 B1 | * | 2/2003 | Underwood ................ 707/4 |
| 6,662,357 B1 | * | 12/2003 | Bowman-Amuah ........ 717/120 |
| 6,684,385 B1 | * | 1/2004 | Bailey et al. ............. 717/109 |
| 6,701,513 B1 | * | 3/2004 | Bailey ...................... 717/109 |
| 6,721,713 B1 | * | 4/2004 | Guheen et al. ............ 705/1 |
| 6,742,175 B1 | * | 5/2004 | Brassard ................... 717/107 |

OTHER PUBLICATIONS

Fowler et al., UML Distilled Applying the Standard Object Modelings Language 1997, pp. 1-173, Chapter 1-11, Addison-Wesley Longman, Inc., Reading, Massachusetts.*
Title: Adam, A Graphical, Object Oriented Database-Design Tool and Code Generator, author: Ellis et al, ACM, 1991.*

(Continued)

*Primary Examiner*—Chameli C. Das
(74) *Attorney, Agent, or Firm*—MacCord Mason PLLC

(57) ABSTRACT

Methods and systems consistent with the present invention provide an improved software development tool that includes a version control system that permits multiple programmers to work simultaneously on a single software project by maintaining a central repository containing a master copy of a software project and by managing versions of the software project that the programmers make through the development process. The improved software development tool enables a programmer to interact with the version control system by interacting with a diagram or diagram element that corresponds to a project, package, diagram, or class, thus facilitating the use of the version control system.

41 Claims, 26 Drawing Sheets

OTHER PUBLICATIONS

Title: A Graphical Extensible Integrated Environment for software Development, author: Wasserman et al, ACM, 1986.*

Title: Design Wizard and Visual Programming Environments for Generators, author: Batory et al, IEEE, Jun., 1998.*

Atria Corporation, "ClearCase Concepts Manual," UMX Edition Release 2.0, Apr. 1994, pp. 1-135.

Fowler et al., UML Distilled Applying the Standard Object Modelings Language 1997, pp. 1-173, Chapters 1-11, Addison-Wesley Longman, Inc, Reading, Massachusets.

Jacobson, "Object-Oriented Software Engineering A Case Driven Approach," 1996, pp. 1-500, Chapters 1-5, Part II, Chapters 6-12, Part III, Chapters 13-16, Addison-Wesley Longman, Inc., Reading, Massachusets.

Rational Software Corporation, "Unified Modeling Language UML Booch & OMT Quidk Reference For Rational Rose 4.0", 1996, Rational Software Corporation, Santa Clara, CA.

Rational Software Corporation, "Rational Rose Using Rational Rose 4.0," 1996, pp. 11-207, Chapters 3-11, Rational Software Corporation, Santa Clara, CA.

* cited by examiner

DIAGRAMMATIC CONTROL OF SOFTWARE IN A VERSION CONTROL SYSTEM

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/839,045, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,525, entitled "Methods and Systems for Finding Specific Line Of Source Code," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,578, entitled "Navigation Links in Generated Documentation," and filed on the same date herewith; and U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool which overcomes the limitations of conventional software development tools. The improved software development tool of the present invention allows a developer to simultaneously view a graphical and a textual display of source code. The graphical and textual views are synchronized so that a modification in one view is automatically reflected in the other view. The software development tool is designed for use with more than one programming language.

The software development tool also includes a version control system that permits multiple programmers to work simultaneously on a single software project by maintaining a central repository containing a master copy of a software project and by managing versions of the software project that the programmers develop during the development process. The software development tool enables programmers to interact with the version control system by manipulating a diagram that corresponds to the software project, thus facilitating the use of the version control system.

In accordance with methods consistent with the present invention, a method is provided in a data processing system for managing versions of source code with a version control system. The method comprises the steps of generating a language-neutral representation of the source code; displaying a diagram representing the source code using the language-neutral representation such that the source code and the diagram are synchronized, the diagram having elements, each element having an associated file containing a portion of the source code; receiving an indication of a selection of one of the elements; determining which files are associated with the selected element; receiving an indication of a selection of a command performable by the version control system; and invoking the version control system to perform the selected command on the determined files.

In accordance with articles of manufacture consistent with the present invention, a computer-readable medium is provided containing instructions for controlling a data processing system to perform a method. The method comprises the steps of receiving an indication of a selection of an element of a diagram having corresponding source code; receiving an indication of a version control command to be performed on the corresponding source code; and, responsive to the receipt of the indication of the selected element and the receipt of the indication of the version control command, performing the version control command on the corresponding source code by a version control system.

In accordance with systems consistent with the present invention, a data processing system is provided. The data processing system includes a secondary storage device containing a software project, the software project comprising source code; a memory containing a software development tool that displays a diagram with diagram elements corresponding to the software project, that receives an indication of a selection of one of the diagram elements that corresponds to a portion of the software project, that receives a selection of a command performable by the version control system, and that invokes the version control system to perform the selected command on the portion of the software project; and a processor for running the software development tool.

In accordance with methods consistent with the present invention, a method is provided in a data processing system. The method comprises the steps of receiving an indication of a selection of an element of a diagram having corresponding source code; receiving an indication of a version control command to be performed on the corresponding source code; and, responsive to the receipt of the indication of the selected element and the receipt of the indication of the version control command, performing the version control command on the corresponding source code by a version control system.

In accordance with systems consistent with the present invention, a data processing system is provided for managing files in a software project with a version control system. The data processing system comprises a first computer including a memory containing a software development tool, which displays a diagram with diagram elements, and a client component of the version control system; a secondary storage containing a working directory; and a processor for running the software development tool; a second computer including a memory containing a software development tool and a server component of the version control system, a secondary storage containing a central repository, and a processor for running the software development tool; and a network connecting the first and second computer; wherein the software development tool on the first computer receives an indication of a selection of one of the diagram elements that corresponds to a portion of the software project, receives an indication of a command performable by the version control system, and invokes the version control system to perform the selected command on the portion of the software project.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
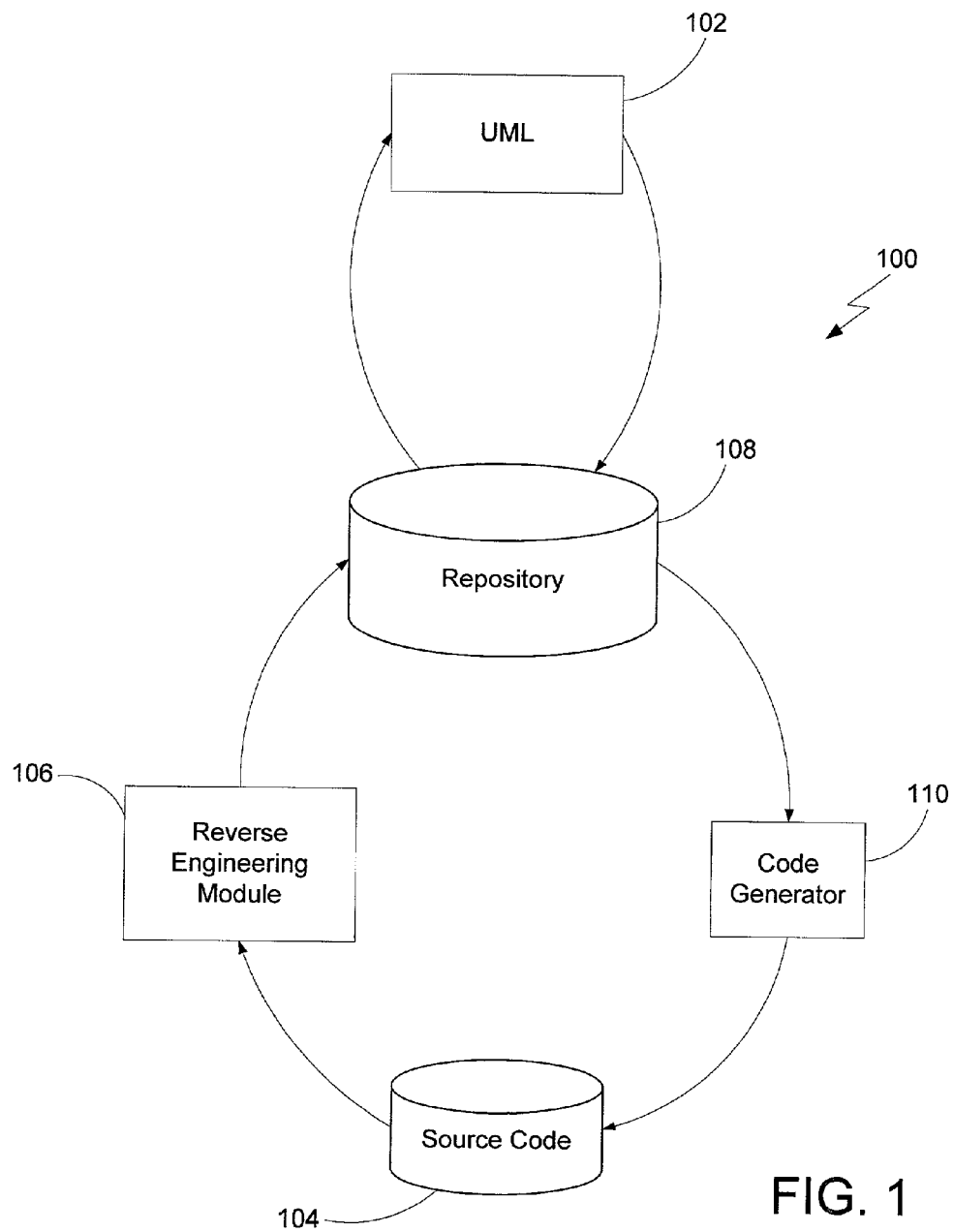
FIG. 1 depicts a conventional software development tool.
Figure 2:
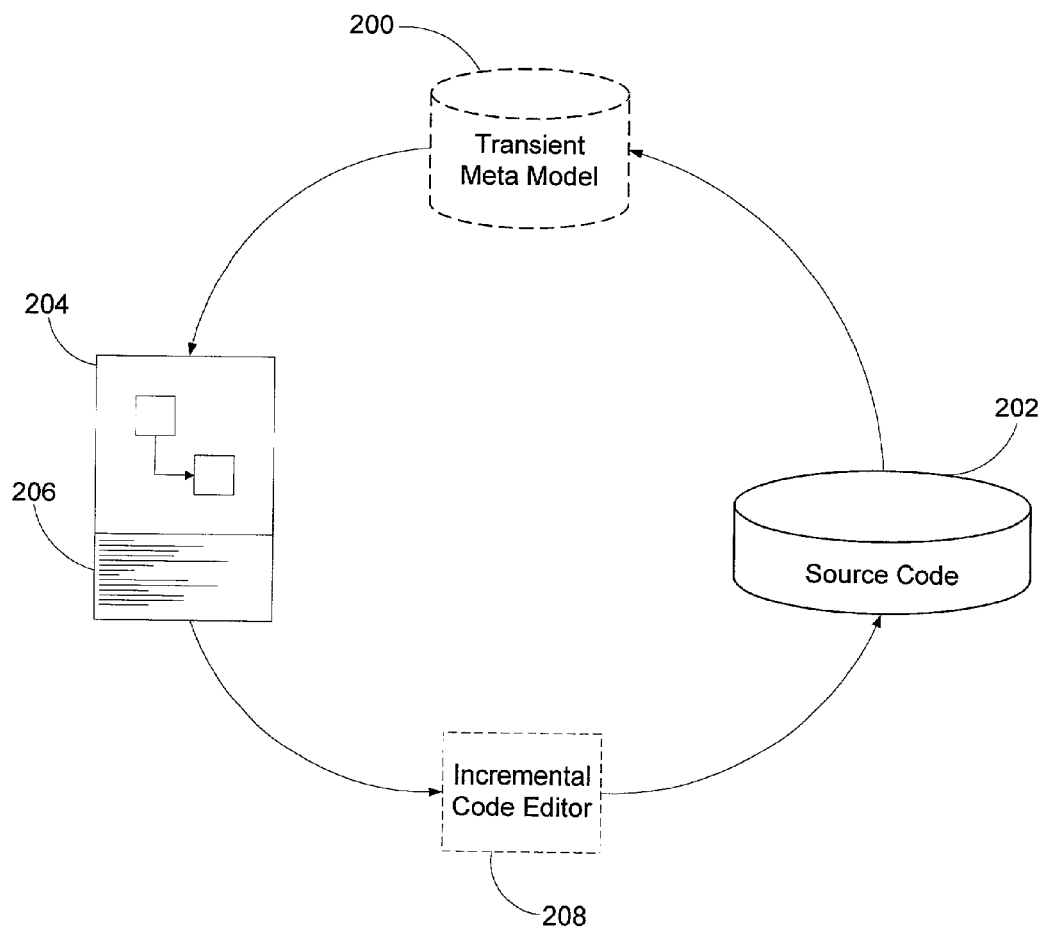
FIG. 2 depicts an overview of a software development tool in accordance with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
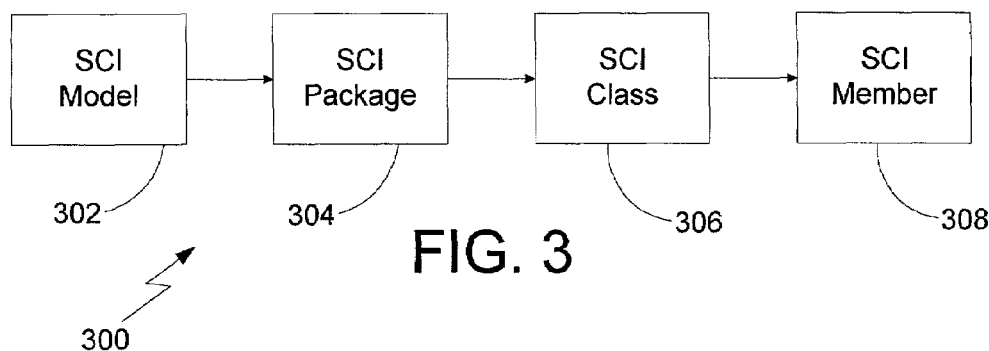
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
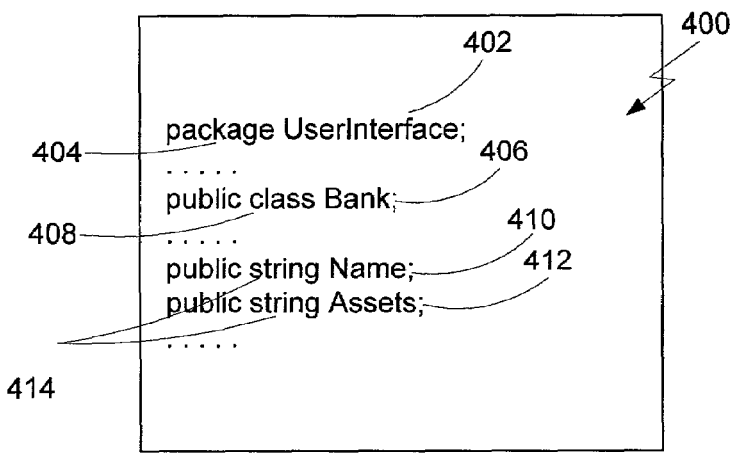
FIG. 4 depicts representative source code.
Figure 5:
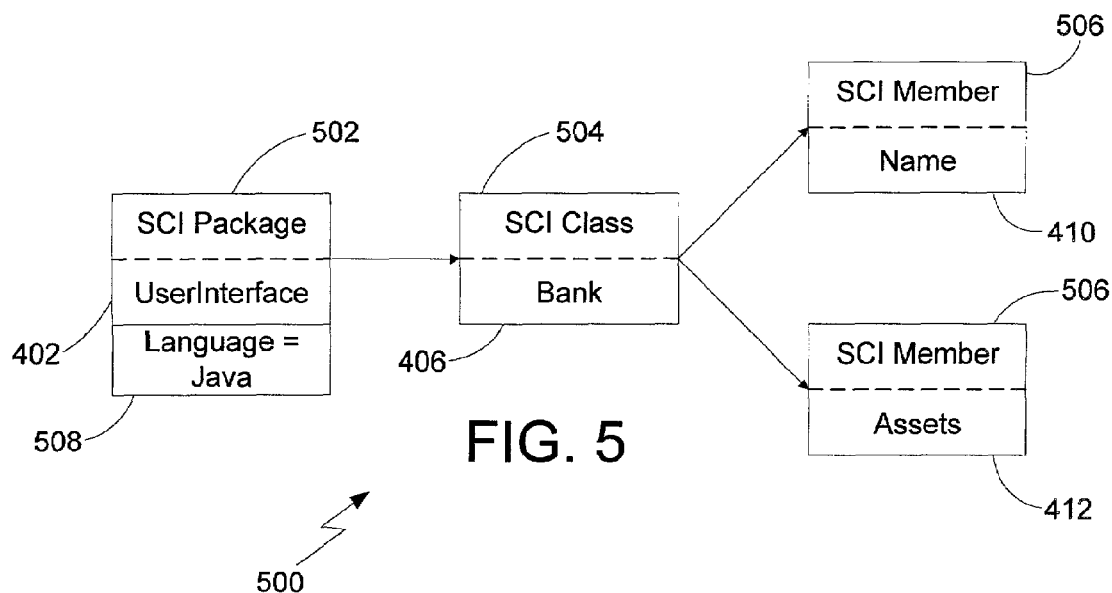
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
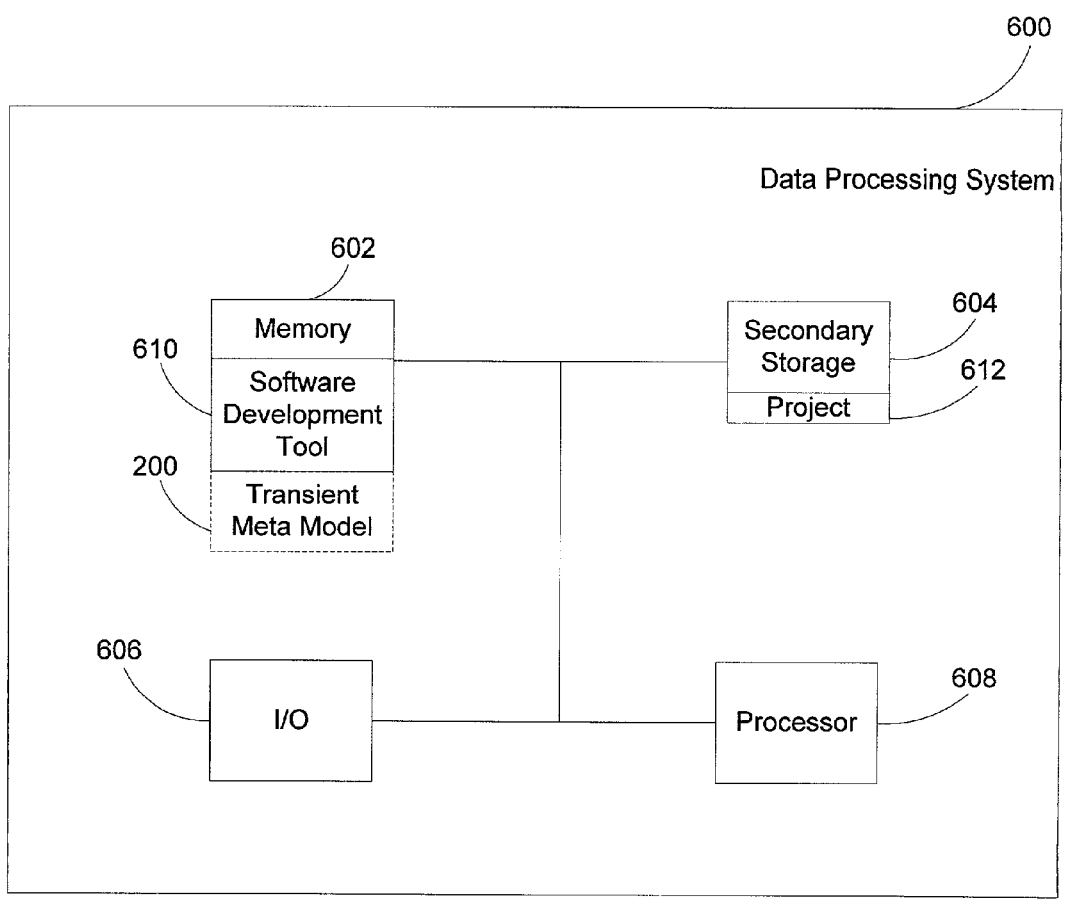
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
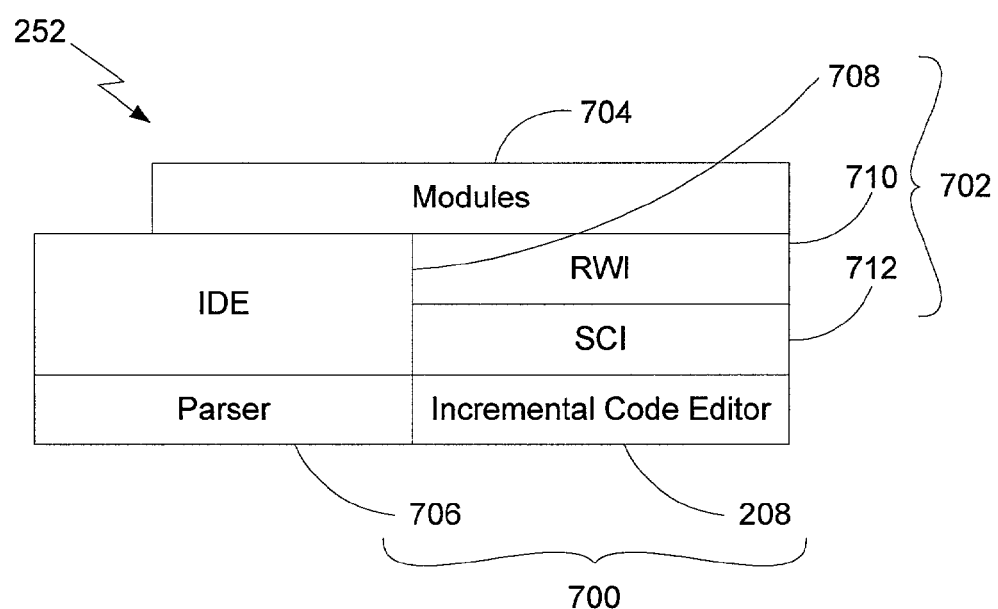
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of classes, interfaces, attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex and requires more testing than one with a smaller overall design complexity. |

TABLE 3-continued

Complexity Metrics

| Complexity Metrics | Description |
| --- | --- |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators' / 'Number of Unique Operands') * ('Number of Operands' / 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
|---|---|
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
|---|---|
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
|---|---|
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
|---|---|
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
|---|---|
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for' -statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
|---|---|
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |

TABLE 11-continued

Critical Errors Audits

| Critical Errors Audits | Description |
| --- | --- |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass-i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
| --- | --- |
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
| --- | --- |
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '* */' and ordinary C-style ones with '*/.' |

TABLE 14

Naming Style Audits

| Naming Style Audits | Description |
| --- | --- |
| Class Name Must Match Its File Name | Checks whether top level classes or interfaces have the same name as the file in which they reside. |

TABLE 14-continued

Naming Style Audits

| Naming Style Audits | Description |
| --- | --- |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
| --- | --- |
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
| --- | --- |
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize( ) Doesn't Call super.finalize( ) | Calling of super.finalize() from finalize( ) is good practice of programming, even if the base class doesn't define the finalize( ) method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True'and 'false' literals should not be used in conditional clauses. |
| Imported Items Must Be Used | It is not legal to import a class or an interface and never use it. This rule checks classes and interfaces that are explicitly imported with their names-that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
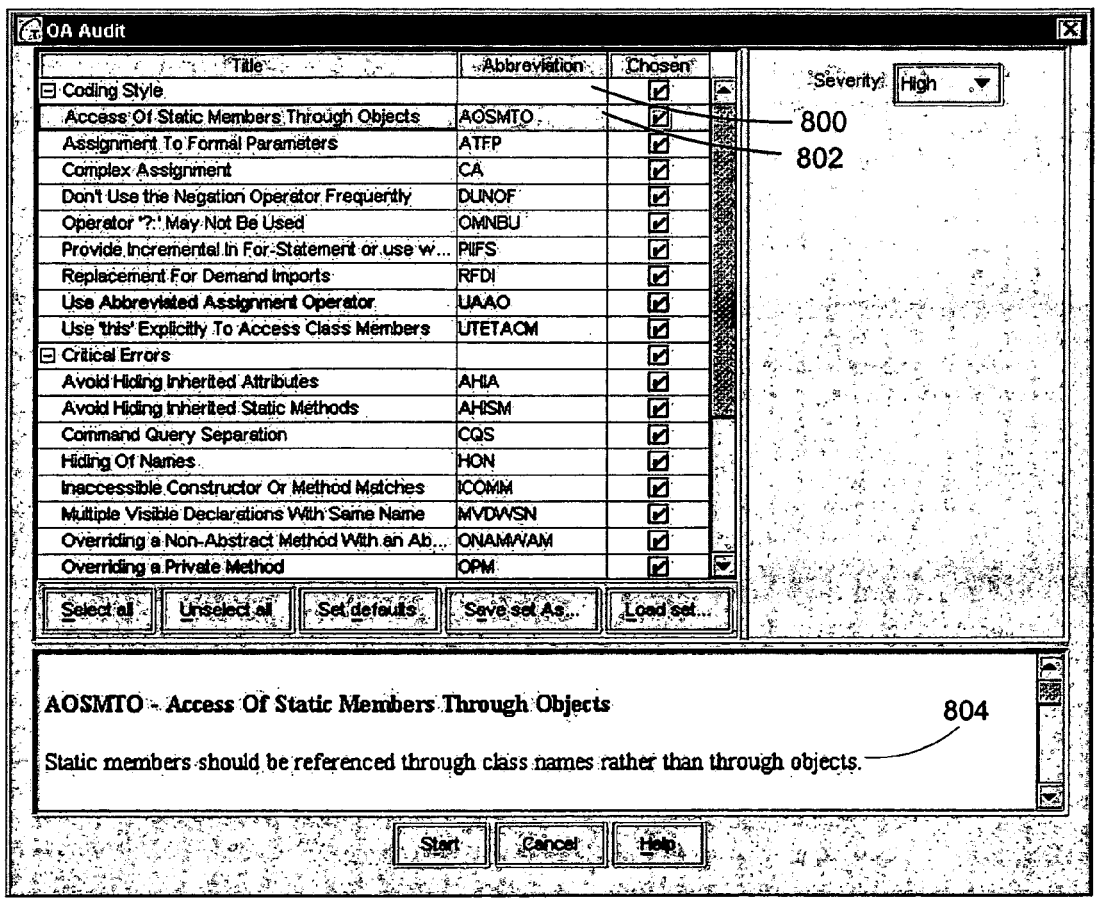
FIG. 8A depicts a user interface displayed by the software development tool depicted in FIG. 2, where the user interface displays a list of predefined criteria which the software development tool checks in the source code.
Figure 8B:
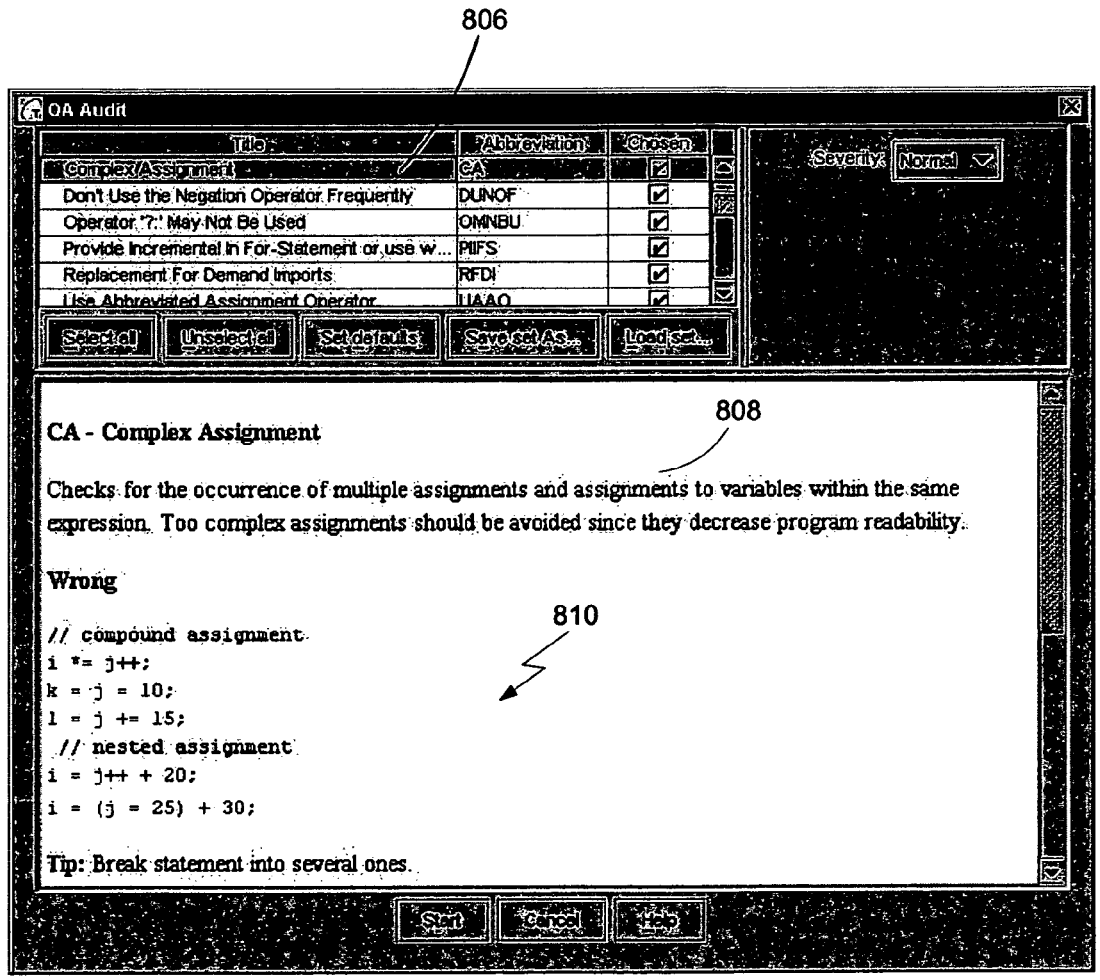
FIG. 8B depicts a user interface displayed by the software development tool depicted in FIG. 2, where the user interface displays the definition of the criteria which the software development tool checks in the source code, and an example of source code which does not conform to the criteria.
Figure 8C:
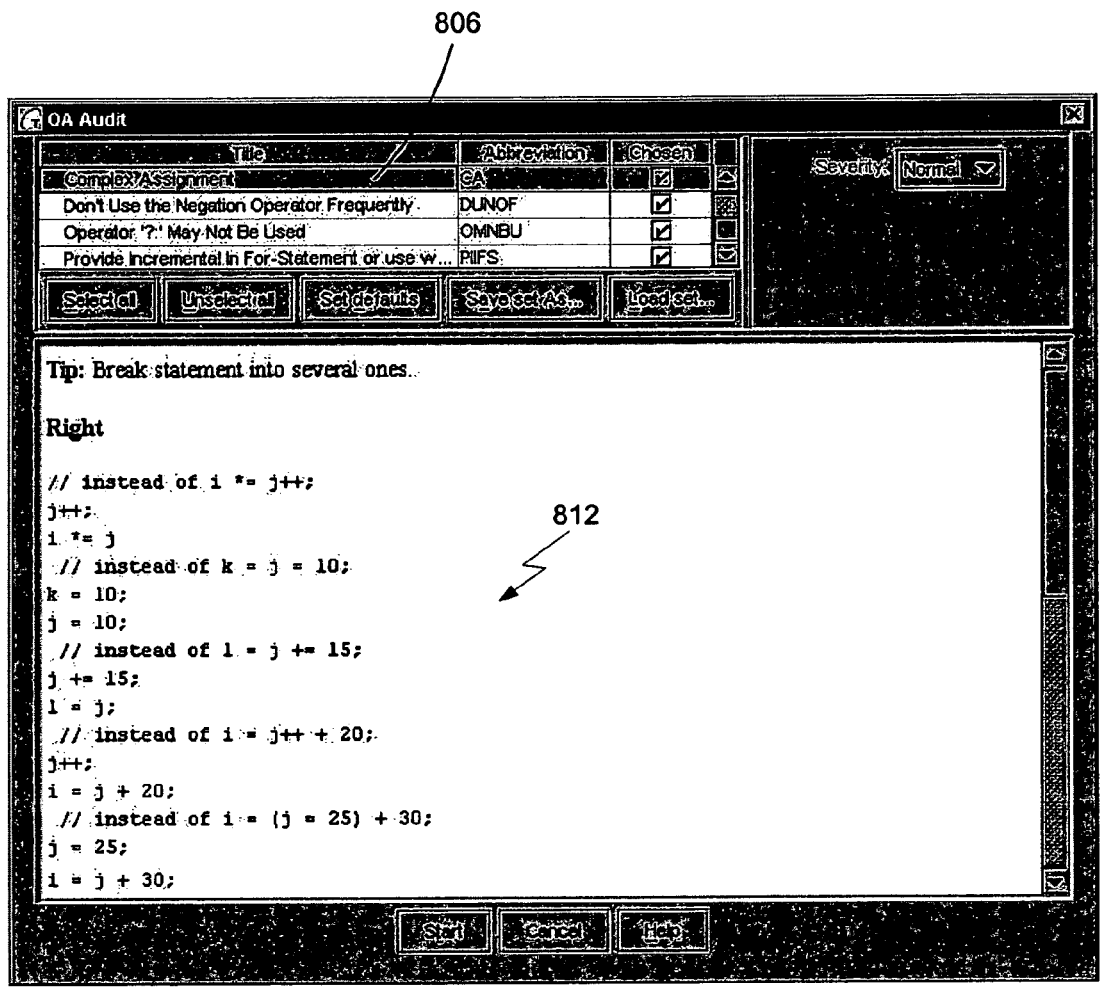
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool scans the source code for other syntax errors and/or other deviations from well known rules, as described above, and provides an error message if any such errors are detected.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. As discussed above, in an alternative embodiment, the textual display may be obtained directly from the source code file. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
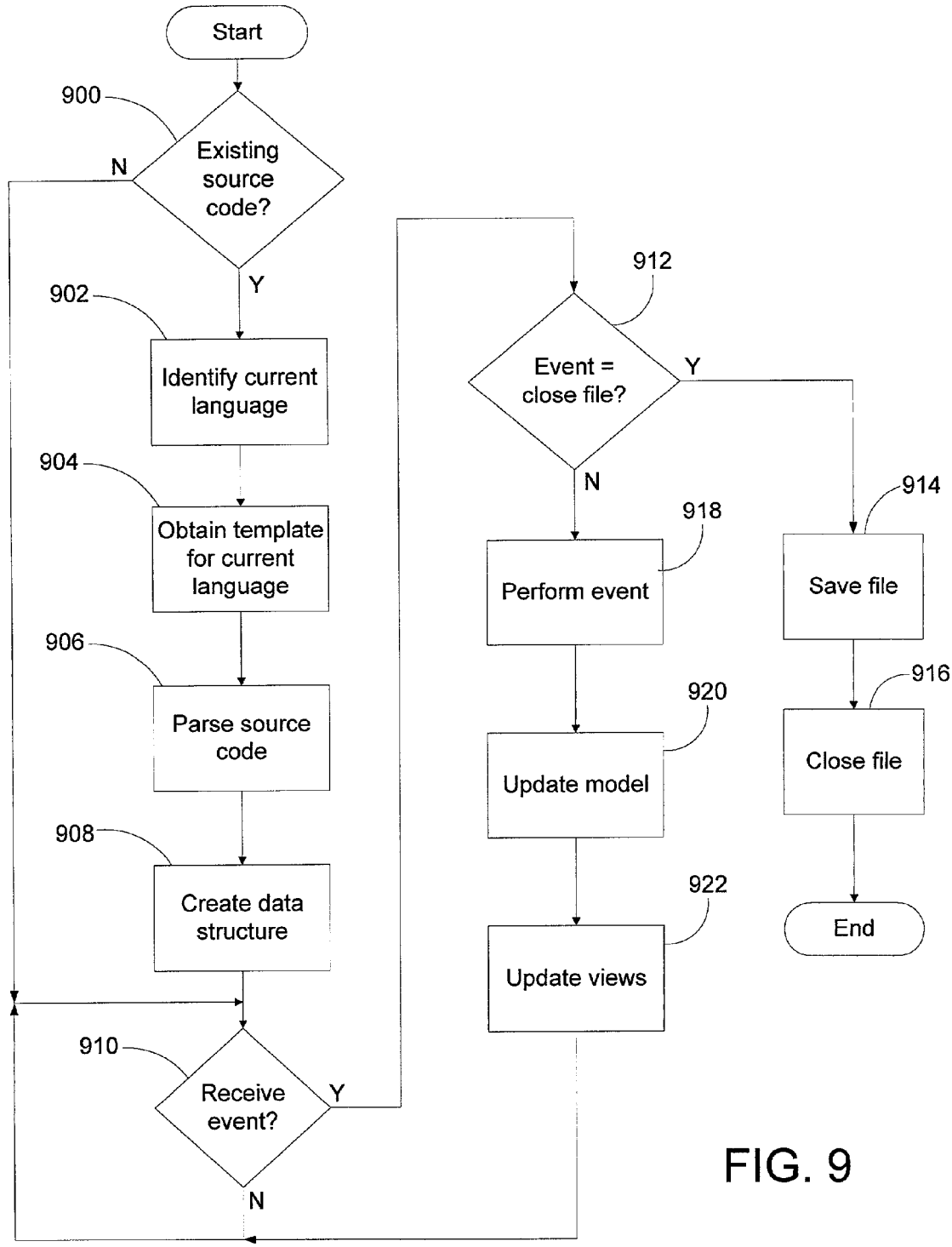
FIG. 9 depicts a flow diagram of the steps performed by the software development tool depicted in FIG. 2.

FIG. 9 depicts a flow diagram of the steps performed by the software development tool to develop a project in accordance with methods consistent with the present invention. As previously stated, the project comprises a plurality of files. The developer either uses the software development tool to open a file that contains existing source code, or to create a file in which the source code will be developed. If the software development tool is used to open the file, determined in step 900, the software development tool initially determines the programming language in which the code is written (step 902). The language is identified by the extension of the file, e.g., ".java" identifies source code written in the Java™ language, while ".cpp" identifies source code written in C++. The software development tool then obtains a template for the current programming language, i.e., a collection of generalized definitions for the particular language that can be used to build the data structure (step 904). For example, the templates used to define a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
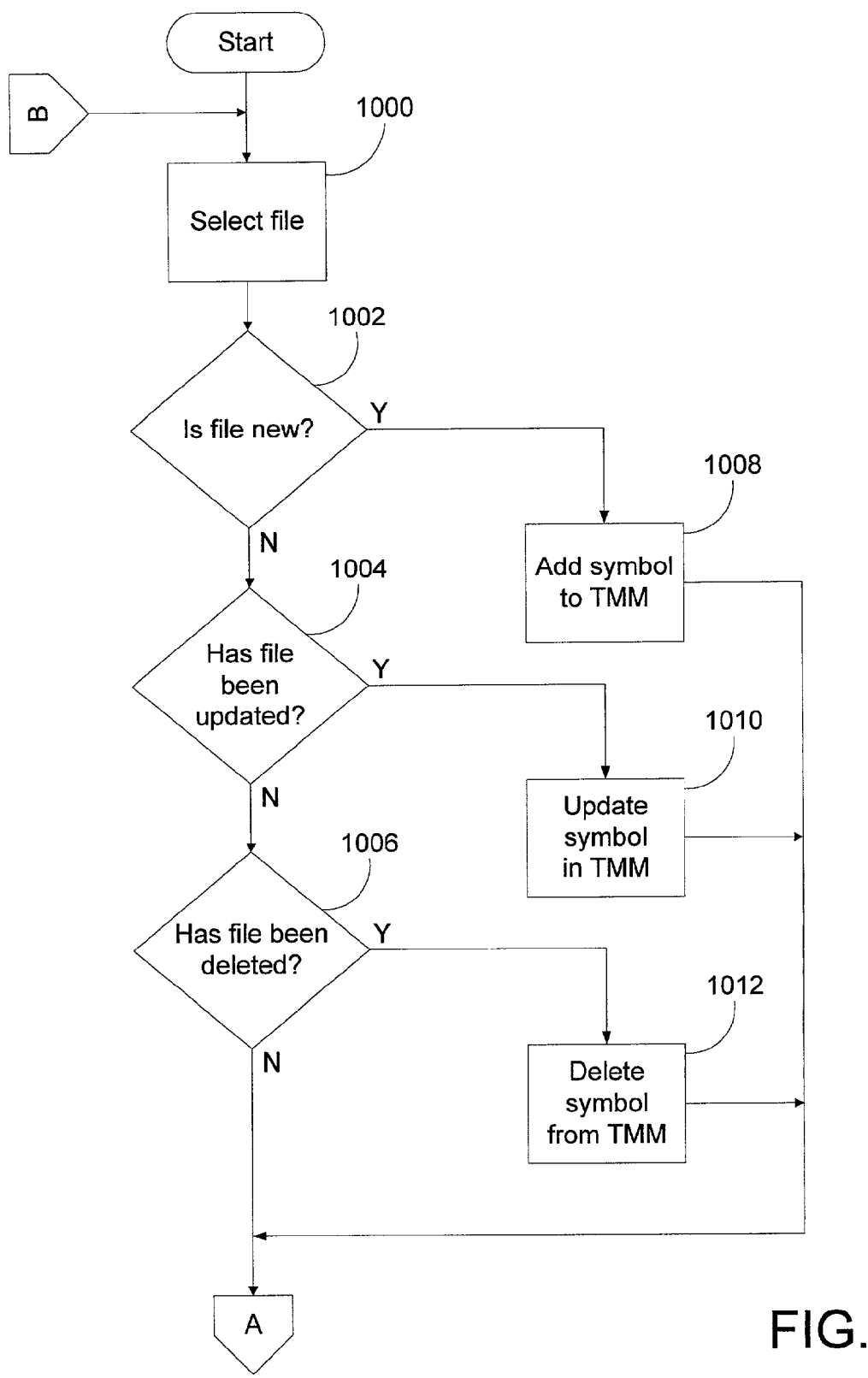
FIGS. 10A and 10B depict a flow diagram illustrating the update model step of FIG. 9.
Figure 10B:
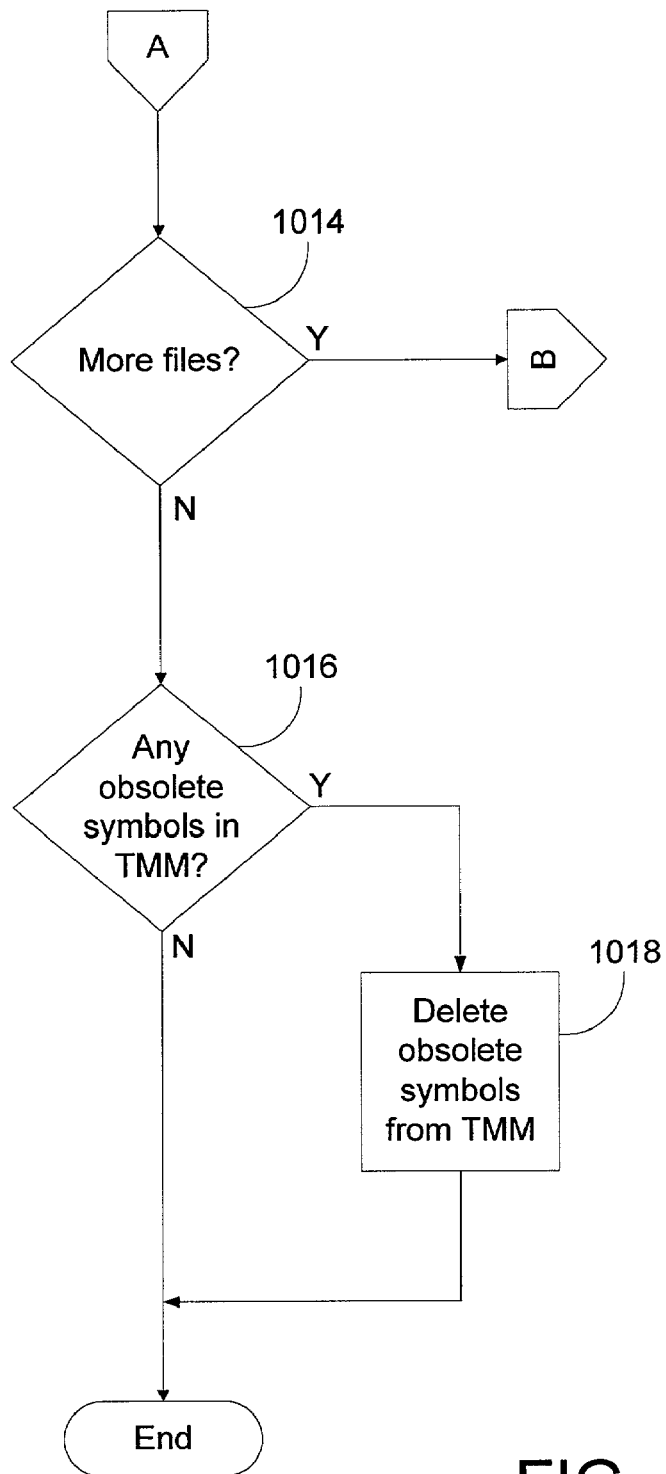

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
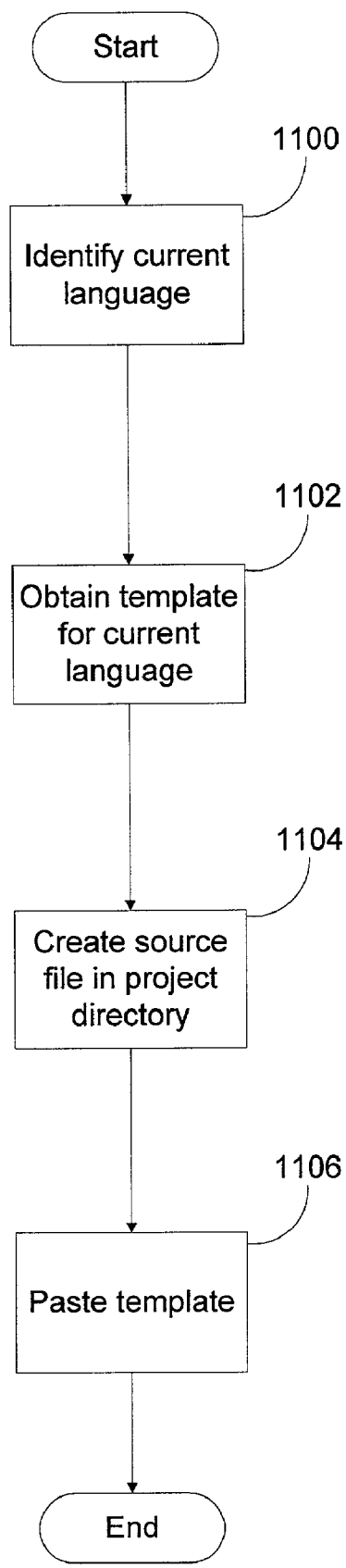
FIG. 11 depicts a flow diagram of the steps performed by the software development tool in FIG. 2 when creating a class.

FIG. 11 depicts a flow diagram illustrating the performance of an event, specifically the creation of a class, in accordance with methods consistent with the present invention. After identifying the programming language (step 1100), the software development tool obtains a template for the language (step 1102), creates a source code file in the project directory (step 1104), and pastes the template into the file (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
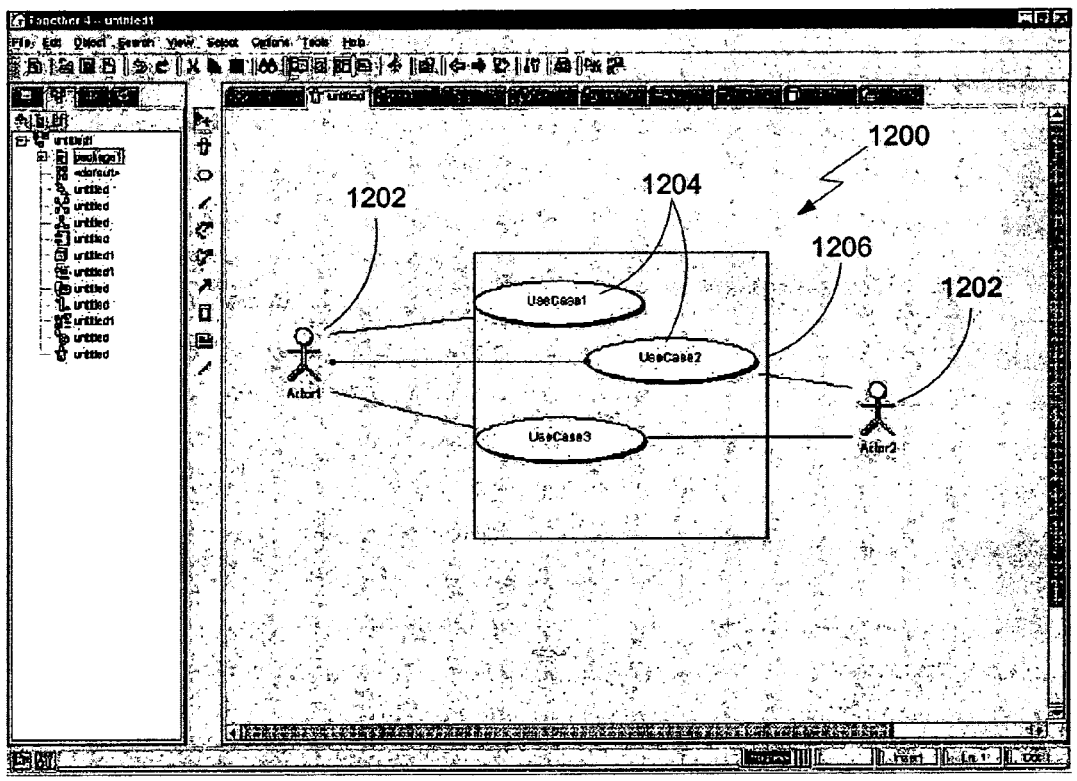
FIG. 12 depicts a user interface displayed by the software development tool depicted in FIG. 2, where the user interface displays a use case diagram of source code.
Figure 13:
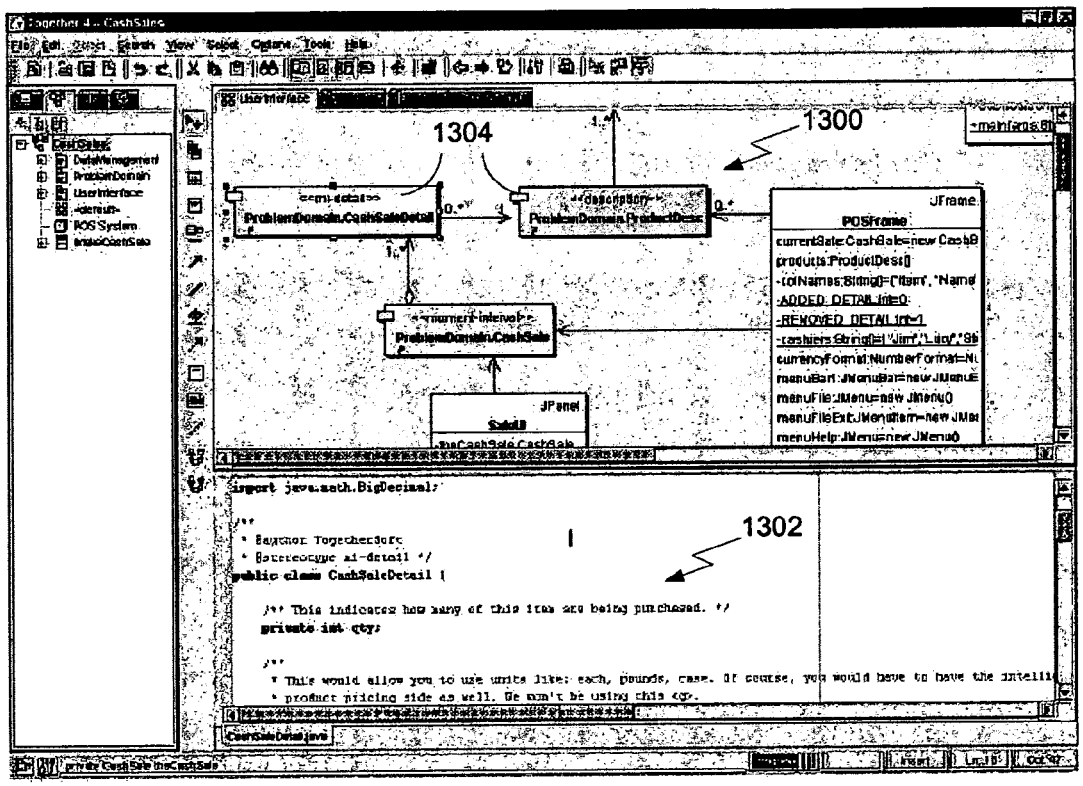
FIG. 13 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
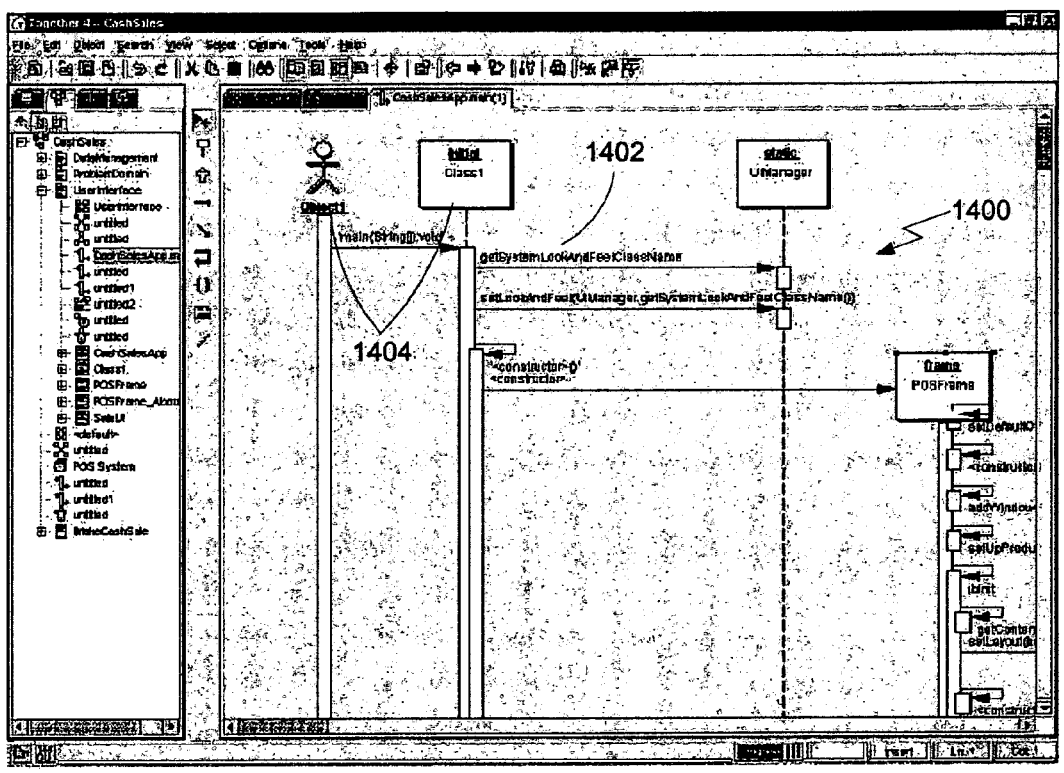
FIG. 14 depicts a user interface displayed by the software development tool depicted in FIG. 2, where the user interface displays a sequence diagram of source code.
Figure 15:
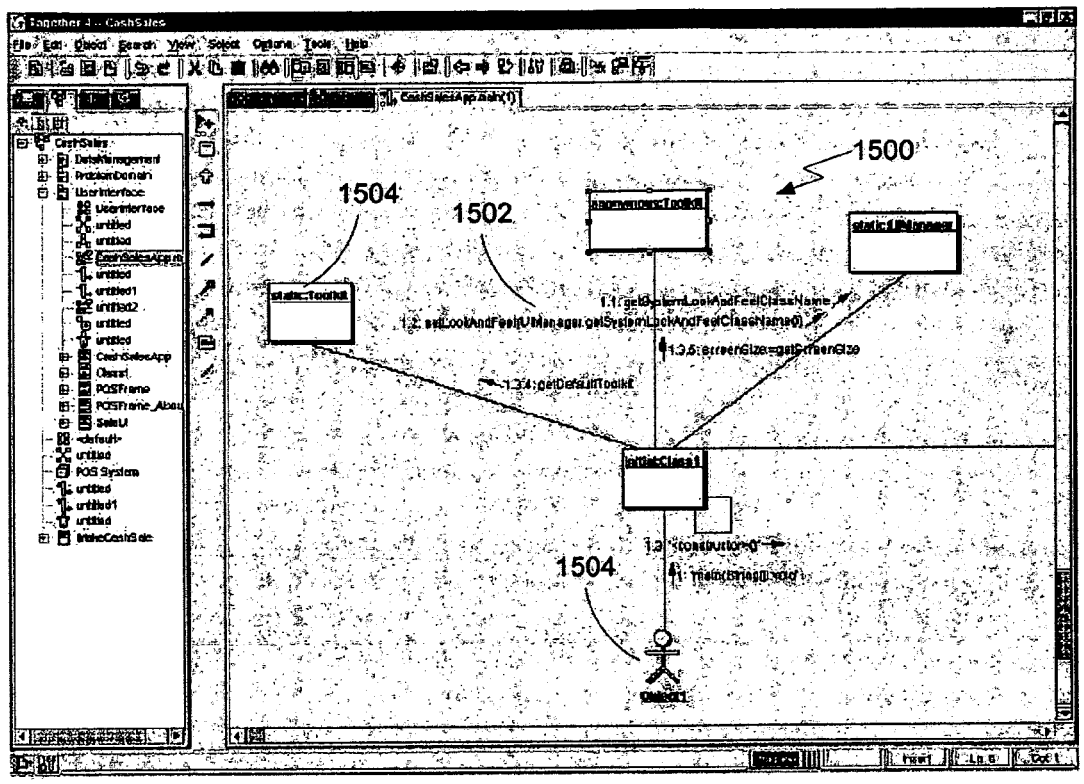
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
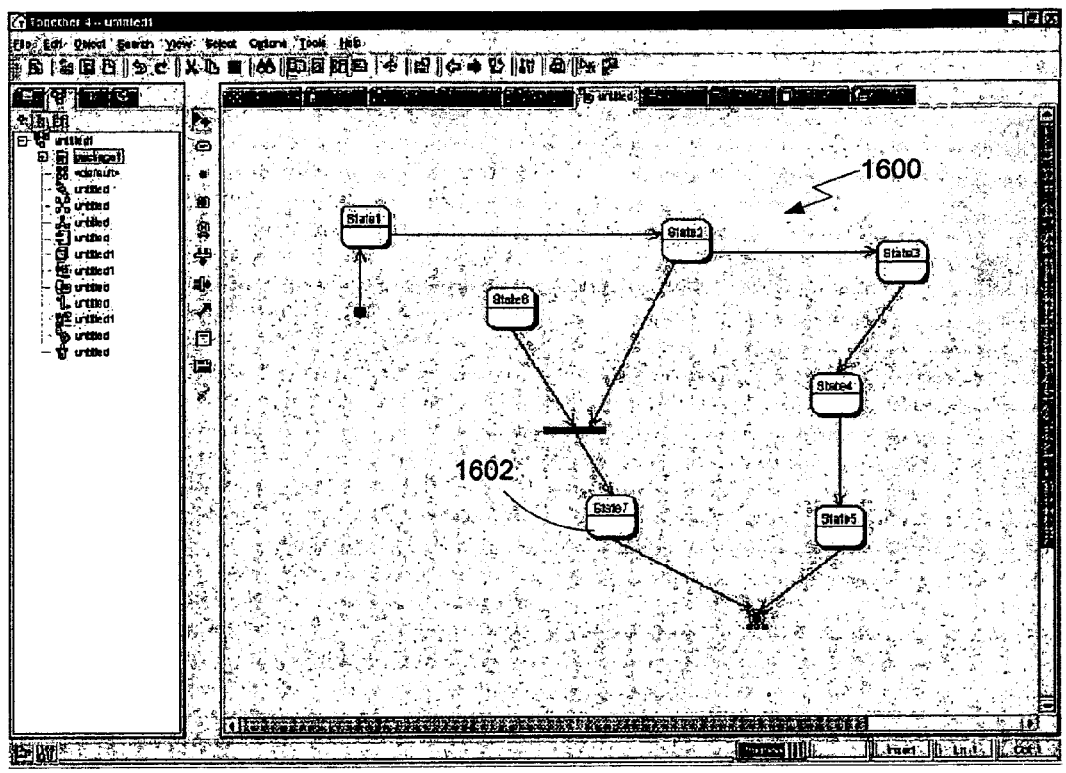
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
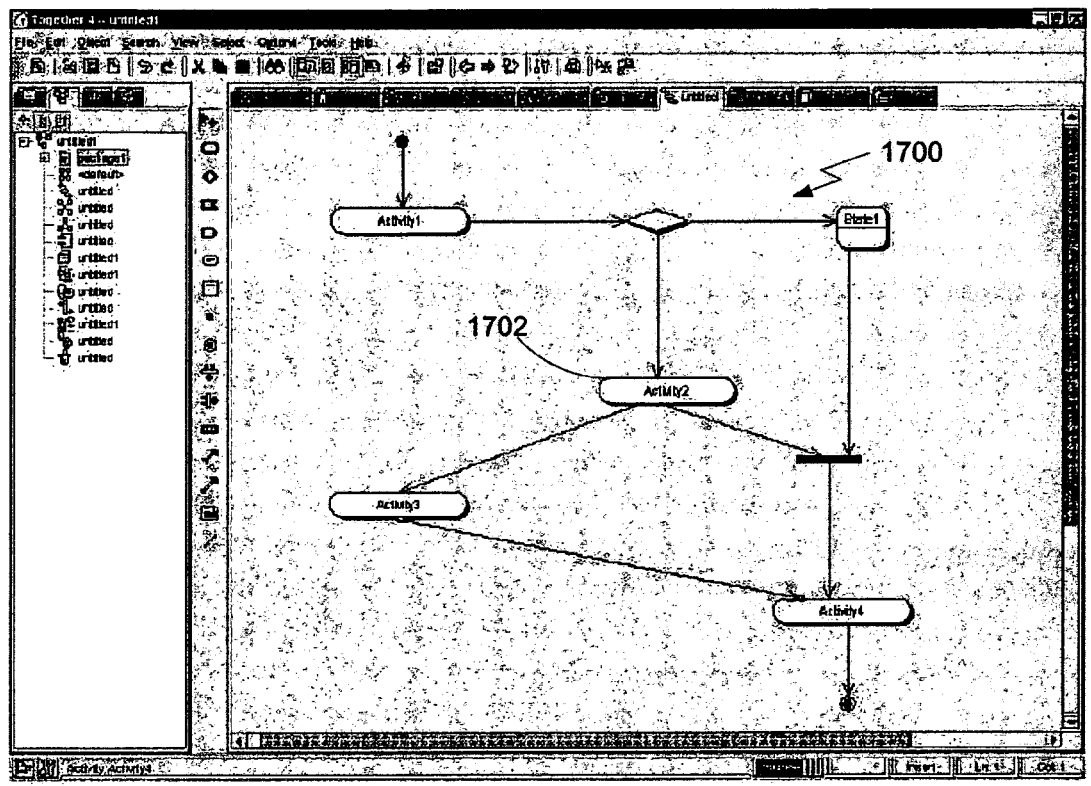
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
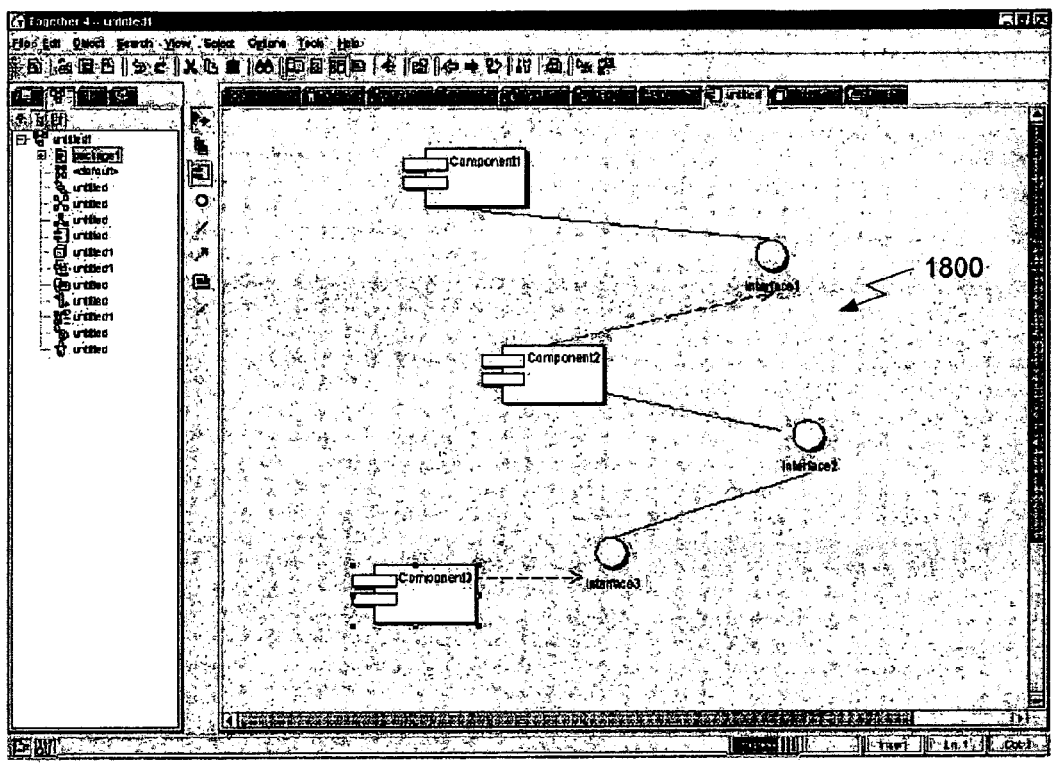
FIG. 18 depicts a user interface displayed by the software development tool depicted in FIG. 2, where the user interface displays a component diagram of source code.
Figure 19:
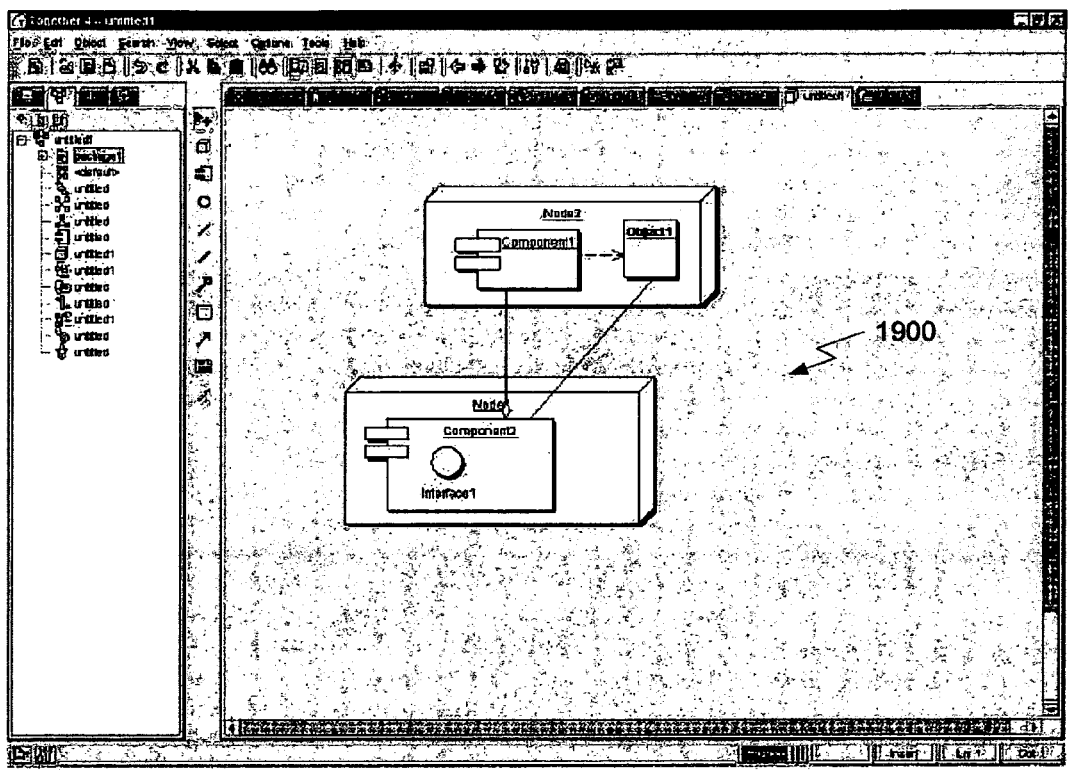
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

Version Control System

Figure 20:
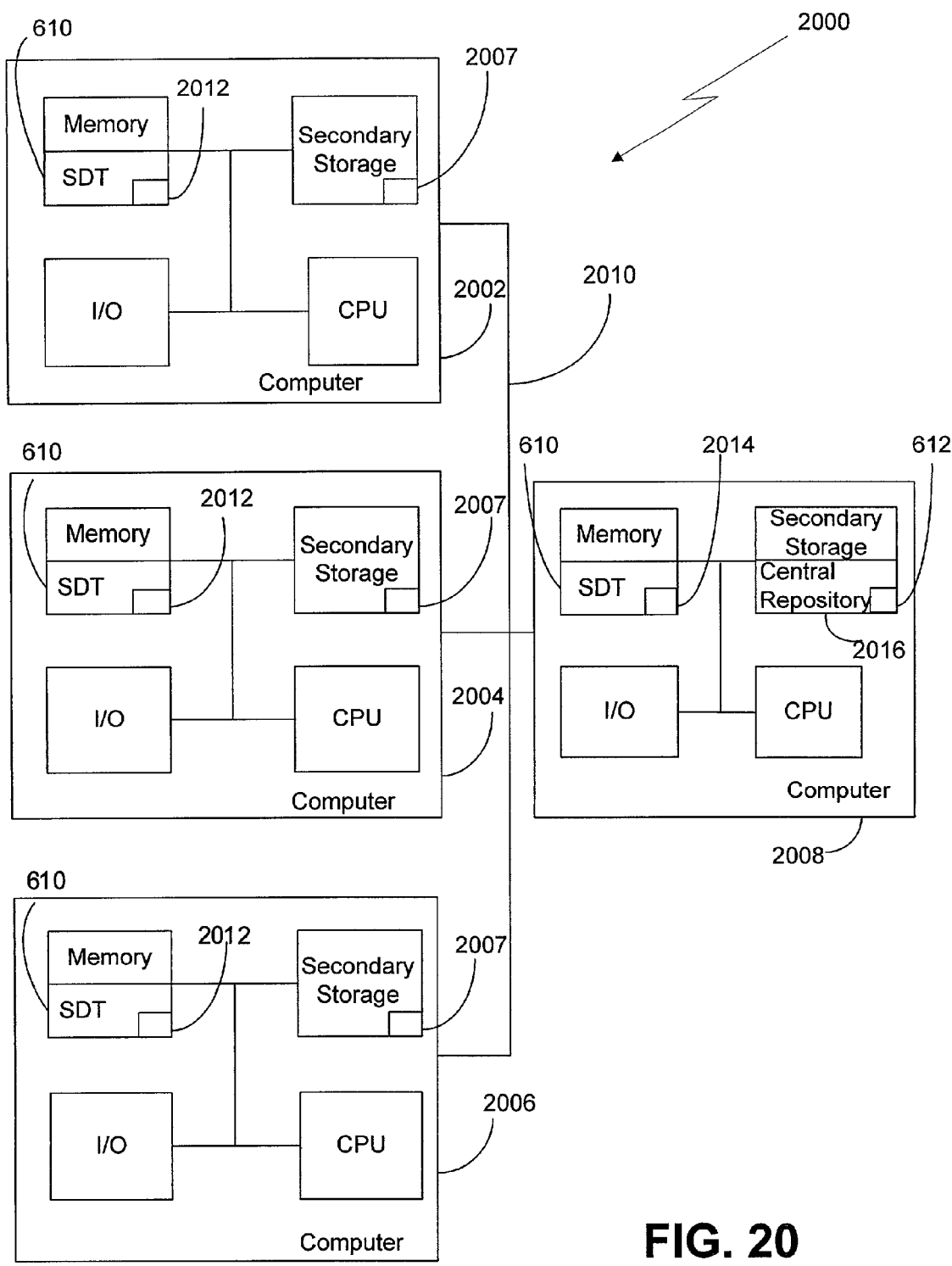
FIG. 20 depicts an exemplary data processing system in which the improved software development tool depicted in FIG. 2 may operate.

In addition to the functionality described above, the improved software development tool integrates a version control system that permits programmers using different computers to work simultaneously on a software project by managing the various versions of the source code associated with the software project. The improved software development tool also enables programmers to interact with the version control system by manipulating a diagram or diagram element associated with a software project, thus facilitating the use of the version control system through a more intuitive interface and a more natural grouping of files. For example, FIG. 20 depicts data processing system 2000, which includes a number of computers 2002–2008 connected via a network 2010, where the users of the computers are using the version control system of the improved software development tool 610. On computers 2002–2006, software development tool 610 includes a client component 2012 of the version control system. On computer 2008, the software development tool 610 contains a server component 2014 of the version control system. Computer 2008 is pre-designated as containing a central repository 2016. Central repository 2016 is a shared directory for storing a master copy of project 612. Project 612 comprises all of the source files in a particular software project. Each of the computers 2002–2006 also includes a working directory 2007 that contains working copies of source files that programmers can make changes to without affecting the master copy in the central repository 2016.

Throughout the development process, as changes are made to source code, versions of files and packages are saved in the central repository. These versions represent snapshots of various stages of the source code as it evolves. The collection of versions stored on the central repository form a historical record of the development process that facilitates debugging and future development of the software project. Table 18 provides a list of typical version control commands and their corresponding operations, which are performed by the version control system in accordance with methods and systems consistent with the present invention. One skilled in the art will appreciate that the particular version control system used and that system's settings may alter the stated functions of each command.

sive acronym for "GNU's Not UNIX"), which is maintained and sponsored by the Free Software Foundation, Inc. of Boston, Mass. The Concurrent Versions System is available on the World Wide Web at http://www.cvshome.org.

Figure 21:
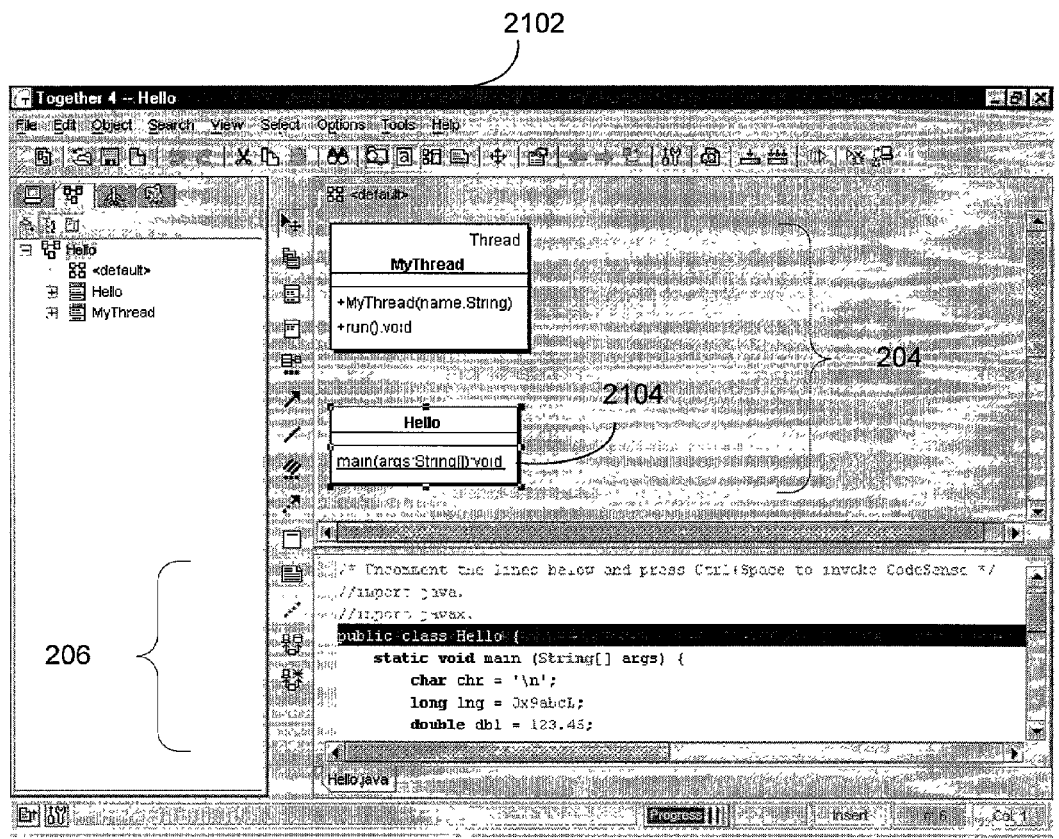
FIG. 21 depicts a user interface displayed by the improved software development tool, where the user interface displays a diagram and corresponding source code.

FIG. 21 depicts a user interface 2102 displayed by improved software development tool 610. User interface 2102 includes a graphical representation 204 and a textual representation 206 of source code of a software project. As described above, graphical representation or diagram 204 is a diagram such as a class diagram, use case diagram, sequence diagram, collaboration diagram, statechart diagram, activity diagram, component diagram, or deployment diagram. Diagram 204 is made up of diagram elements. The diagram elements are the individual graphical symbols that combine to form diagram 204 and that serve to visually represent the source code and its structure and/or operation. For example, in the diagram depicted in FIG. 21, which is a class diagram, the rectangular box labeled "Hello" is a diagram element that represents the class named "Hello."

An example of a typical user interaction with the version control system via a diagram element will now be described. In this example, it is assumed that the user is viewing a diagram using the improved software development tool and that the diagram visually represents a source file named "Hellojava" that contains a class named "Hello." It is further assumed that the user wishes to verify that he has the most current version of the source code for the "Hello" class by synchronizing his working copy of the file that contains that class with the most current version of the file in the central repository (i.e., he wishes to perform an "Update" command on the file that contains the "Hello" class). With reference to FIG. 21, a user first determines which portion of source code in the software project he wishes to execute a version control command on by visually inspecting diagram 204 of user interface 2102. The user then selects the desired diagram element, in this example diagram element 2104, which corresponds to the class "Hello." The selection is accomplished when the user right clicks within the rectangular area of the diagram element 2104. The selection of diagram element 2104 informs the version control system that the command that will soon be invoked should be performed on the file containing the class "Hello." The user next selects

TABLE 18

Typical Version Control Commands

| COMMAND | OPERATION |
|---|---|
| Get | Acquires a copy of one of the versions of a selected file from the central repository and places a read only copy of the file in the working directory of the requesting computer. |
| Check Out | Acquires a copy of one of the versions of a selected file from the central repository, places a copy of the file in the working directory of the requesting computer, and prevents others from checking the file out from the repository. |
| Add | Transfers a copy of the selected file from the working directory of the requesting computer to the central repository. |
| Update | Synchronizes the working copy of a file with the most current version of the corresponding file in the central repository. |
| Check In | Commits changes that have been made to a working copy of a file on the requesting computer to the corresponding file on the central repository, thus creating a new version of the file. |

Figure 22:
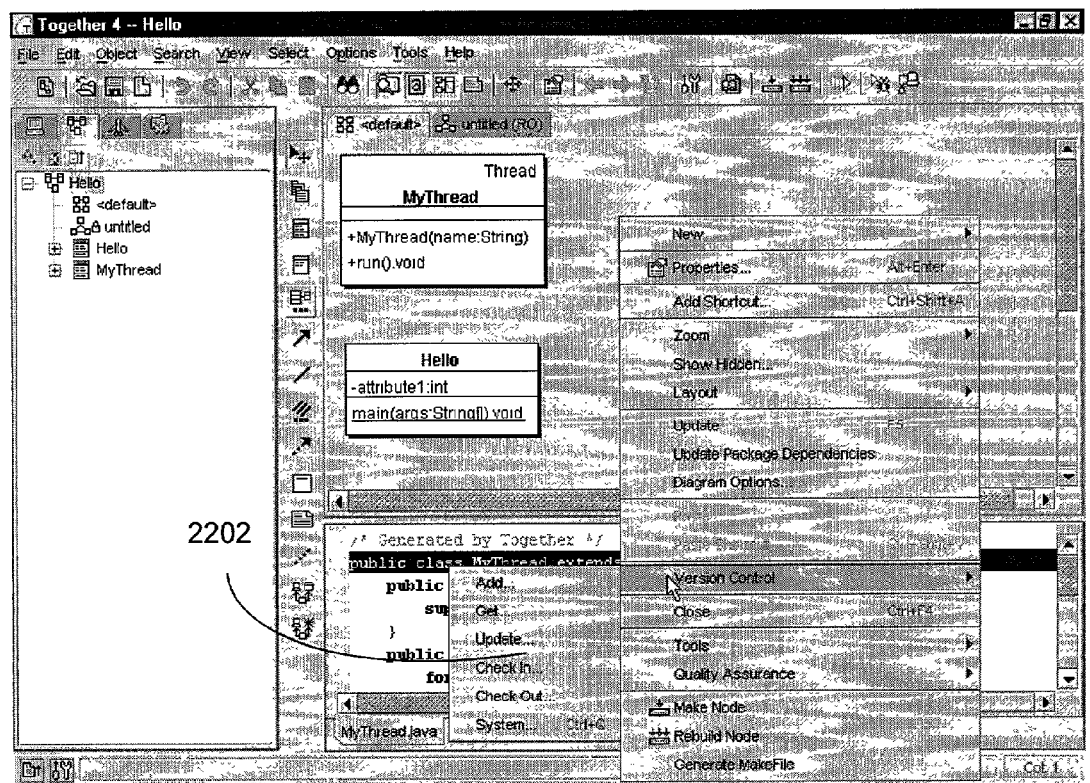
FIG. 22 depicts a user interface displayed by the improved software development tool that is used to invoke the version control system depicted in FIG. 20.

An example of a version control system that is suitable for use with the improved software development tool is the Concurrent Versions System, which is an open-source version control system developed by the GNU Project (recurthe "Update" command from speedmenu 2202, depicted in FIG. 22, thus providing improved software development tool 610 with an indication of the desired version control command.

Figure 23:
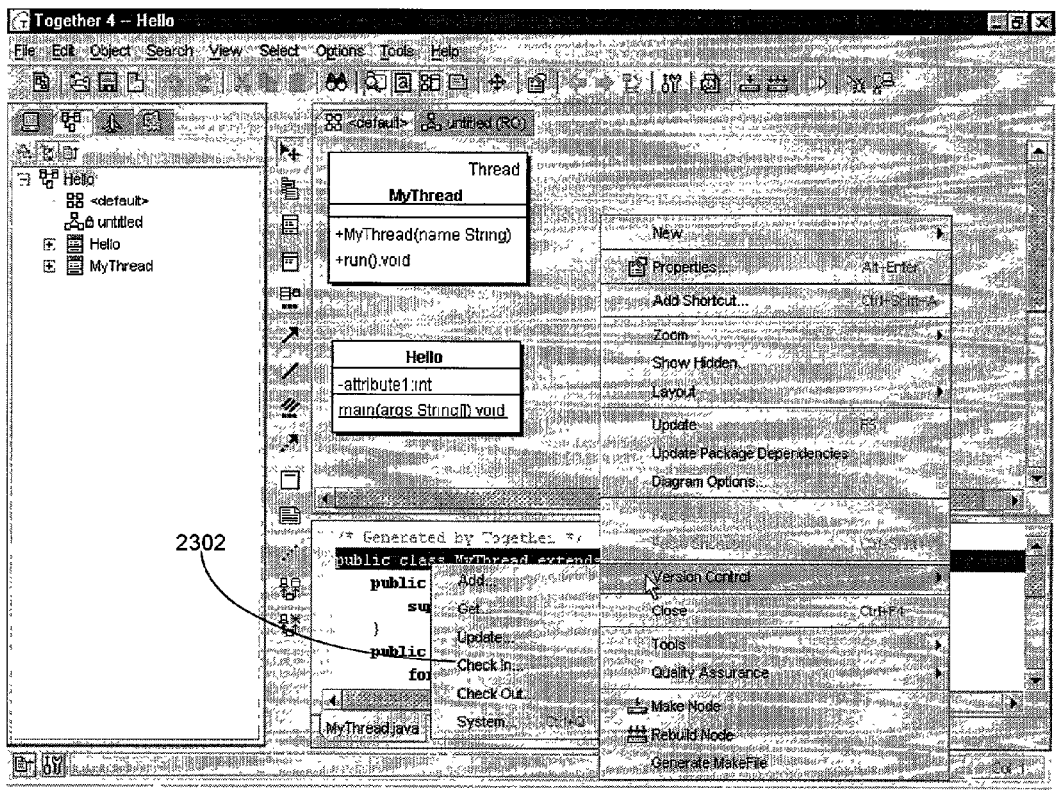
FIG. 23 depicts a user interface displayed by the improved software development tool.

In response to the selection of the "Update" command, the improved software development tool displays a dialog box 2302, like the one depicted in FIG. 23. The user then selects any desired options associated with the "Update" command via dialog box 2302. For example, if the diagram element that a user selects represents a directory that includes multiple subdirectories, the user may select the "Recurse subdirectories" option and the "Update" command would be executed with respect to the directory and all of its subdirectories. Alternatively, the user might choose to execute a command with respect to an entire project, a package, a diagram, or a class. After options are selected, the improved software development tool 610 invokes the version control system to perform the operation corresponding to the "Update" command. In this example, the version control system synchronizes the working copy of "Hello.java" on the requesting computer with the most recent version of that file in the central repository. This assures that the user's working copy of "Hello.java" is the most up-to-date version of that file.

Figure 24A:
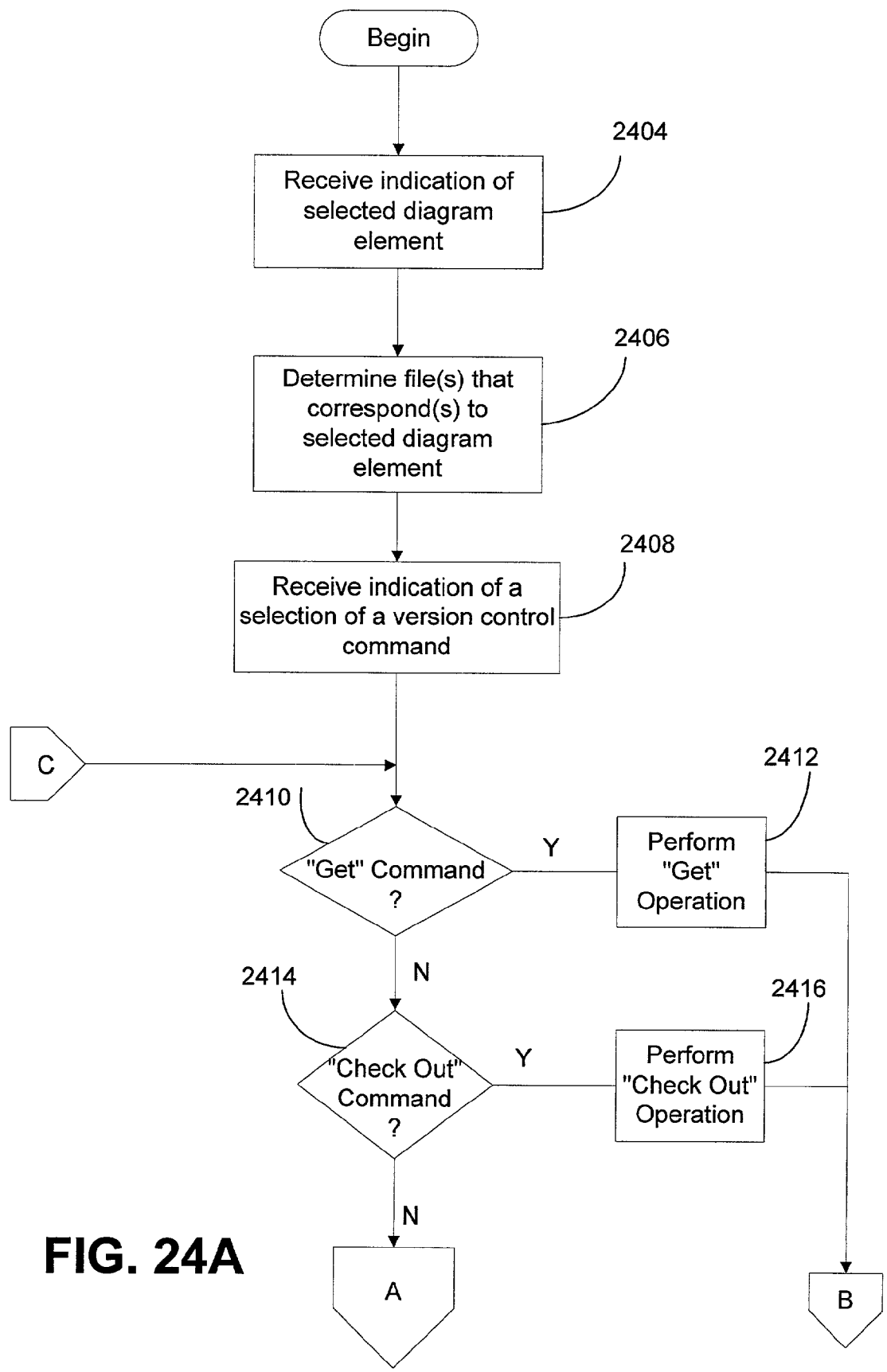
FIGS. 24A & 24B depict a flow diagram of exemplary steps performed by the improved software development tool.
Figure 24B:
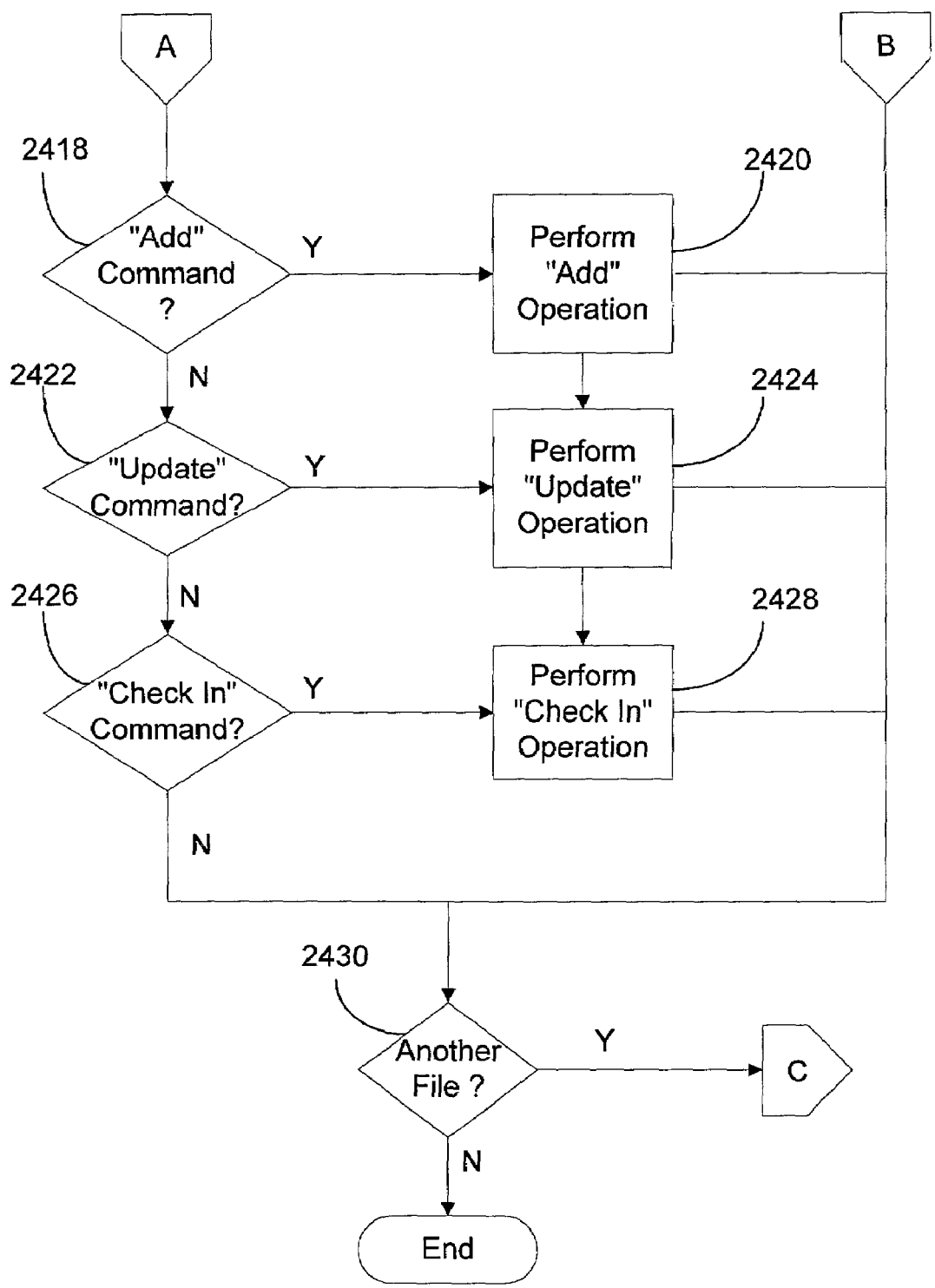

A detailed description will now be given, with reference to FIGS. 24A and 24B, of the steps involved in diagrammatic control of the version control system. When a user wishes to execute a version control command with respect to a specific file in a software project, the user selects the diagram element that visually represents the desired file by right clicking within the rectangular boundary of the diagram element. The relationship between diagram elements and files will be discussed further below. The selection of a diagram element by the user provides the improved software development tool with an indication of the selection of the specific diagram element (step 2404). The improved software development tool then determines the file that corresponds to the selected diagram element (step 2406), by referring to a cross-reference table maintained by the improved software development tool, which correlates the source files in the software project with the diagram elements that visually represent them. The cross-reference table contains an entry for each diagram element (e.g., the entry may be an arbitrary designation to identify each diagram element) and, for each diagram element, contains entries regarding the location and bounds of the diagram element (i.e., information regarding the position at which the diagram element is displayed on the user's screen and the area the diagram encompasses) and the source file or files that the diagram visually represents (e.g., the source code associated with the diagram element 2104 associated with the "Hello" class is located in the source file "Hello.java").

Next, a user selects a desired version control command from a menu of commands via a speed menu like the one depicted in FIG. 22 and further selects desired command options via a dialog box like the one depicted in FIG. 23 (step 2408). These selections provide improved software development tool 610 with an indication of the desired version control command and options. Improved software development tool 610 determines which version control command has been selected based on the user selection and invokes the version control system to perform the corresponding operation on the file or set of files associated with the selected diagram element.

For example, if the "Get" command were selected (step 2410), the version control system would acquire a copy of one of the versions of a selected file (i.e., the most current version of the file may be acquired or an earlier version may be acquired) from the central repository and place a read-only copy of the file in the working directory of the requesting computer (step 2412). If the "Check Out" command were selected (step 2414), the version control system would acquire a copy of one of the versions of a selected file from the central repository, place a copy of the file in the working directory of the requesting computer, and prevent others from checking the file out from the repository (step 2416). If the "Add" command were selected (step 2418), the version control system would transfer a copy of the selected file from the working directory of the requesting computer to the central repository (step 2420). If the "Update" command were selected (step 2422), the version control system would synchronize the working copy of a file with the most current version of the corresponding file in the central repository (step 2424). If the "Check In" command were selected (step 2426), the version control system would commit changes that have been made to a working copy of a file on the requesting computer to the corresponding file on the central repository (step 2428).

After the selected operation is performed, the improved software development tool determines if any files remain on which the selected version control command is to be executed (step 2430). If files remain, the version control system proceeds to step 2410. If not, processing ends.

While various embodiments of the invention have been described, it will be apparent to those of ordinary skill in the art that many more embodiments and implementations are possible that are within the scope of this invention. For example, the diagrammatic control techniques described above may be applied whenever a diagram element can be associated with a source file. In addition, one skilled in the art would understand that the diagrammatic control techniques described herein are equally applicable to quality assurance systems such as the metrics and audit systems of the improved software tool 610 described above. Accordingly, the invention is not to be restricted except in light of the attached claims and their equivalents.

What is claimed is:

1. A method in a data processing system for managing versions of a project source code with a version control system, wherein the source code is generated using a software development tool, the method comprising the steps of:
generating a language-neutral representation of the source code;
displaying a graphical diagram and a textual representation of the source code using the language-neutral representation stored in a non-repository transient meta-model,
wherein changes made to either the textual or the diagrammatic displays are automatically used to convert the language neutral representation and the source code such that the source code and the diagram are synchronized, and
wherein the diagram is composed of elements, each element having an associated file containing a portion of the source code;
receiving an indication of a selected one of the elements;
determining which file is associated with the selected element;
receiving an indication of a selection of a command performable by the version control system; and
invoking the version control system to perform the selected command on the determined file.

2. The method of claim 1, wherein the step of receiving an indication of a selection of an element includes the step of receiving an indication of a right-click of a mouse.

3. The method of claim 1, wherein the displaying step includes displaying a class diagram.

4. The method of claim 1, wherein the displaying step includes displaying a use case diagram.

5. The method of claim 1, wherein the displaying step includes displaying a sequence diagram.

6. The method of claim 1, wherein the displaying step includes displaying a collaboration diagram.

7. The method of claim 1, wherein the displaying step includes displaying a state transition diagram.

8. The method of claim 1, wherein the displaying step includes displaying an activity diagram.

9. The method of claim 1, wherein the displaying step includes displaying a package diagram.

10. The method of claim 1, wherein the displaying step includes displaying a component diagram.

11. The method of claim 1, wherein the displaying step includes displaying a deployment diagram.

12. The method of claim 1, wherein the step of invoking includes invoking the version control system to obtain a working copy of the determined file from a central repository containing a master copy of the source code.

13. The method of claim 12, wherein the step of storing includes restricting the working copy to be read only.

14. The method of claim 1, wherein the step of invoking includes invoking the version control system to acquire a copy of a version of a selected file from a central repository, to place the copy of the file in a working directory on a requesting computer, and to prevent others from checking out the file.

15. The method of claim 14, wherein the version acquired by the version control system is a most current version.

16. The method of claim 14, wherein the requesting computer is a client component of the version control system.

17. The method of claim 14, wherein a computer containing the central repository is a server component of the version control system.

18. The method of claim 1, wherein the step of invoking includes invoking the version control system to transfer a copy of a selected file from a working directory on a requesting computer to a central repository.

19. The method of claim 1, wherein the step of invoking includes invoking the version control system to synchronize a working copy of a selected file with a most current version of the file in a central repository.

20. The method of claim 1, wherein the step of invoking includes invoking the version control system to commit changes made to a working copy of a selected file to a corresponding file on a central repository.

21. A data processing system for managing files in a software project with a version control system, comprising:
    means for generating a language-neutral representation of a project source code;
    means for displaying a graphical diagram and a textual representation of the source code using the language-neutral representation stored in a non-repository transient meta-model,
        wherein changes made to either the textual or the diagrammatic displays are automatically used to convert the language-neutral representation and the source code such that the source code and the diagram are synchronized, and
        wherein the diagram is composed of elements, each element having an associated file containing a portion of the source code;
    means for receiving an indication of a selected one of the elements;
    means for determining which file is associated with the selected element;
    means for receiving an indication of a selection of a command performable by the version control system; and
    means for invoking the version control system to perform the selected command on the determined file.

22. A computer-readable medium containing instructions for controlling a data processing system to perform a method for managing files in a software project with a version control system, the method comprising the steps of:
    generating a language-neutral representation of a project source code;
    displaying a graphical diagram and a textual representation of the source code using the language-neutral representation stored in a non-repository transient meta-model,
        wherein changes made to either the textual or the diagrammatic displays are automatically used to convert the language neutral representation and the source code such that the source code and the diagram are synchronized, and
        wherein the diagram is composed of elements, each element having an associated file containing a portion of the source code;
    receiving an indication of a selection of one of the elements of the diagram having corresponding source code;
    receiving an indication of a version control command to be performed on the corresponding source code; and
    responsive to the receipt of the indication of the selected element and the receipt of the indication of the version control command, performing the version control command on the corresponding source code by the version control system.

23. The computer-readable medium of claim 22, wherein the diagram is a class diagram.

24. The computer-readable medium of claim 22, wherein the diagram is a use case diagram.

25. The computer-readable medium of claim 22, wherein the diagram is a sequence diagram.

26. The computer-readable medium of claim 22, wherein the diagram is a collaboration diagram.

27. The computer-readable medium of claim 22, wherein the diagram is a state transition diagram.

28. The computer-readable medium of claim 22, wherein the diagram is an activity diagram.

29. The computer-readable medium of claim 22, wherein the diagram is a package diagram.

30. The computer-readable medium of claim 22, wherein the diagram is a component diagram.

31. The computer-readable medium of claim 22, wherein the diagram is a deployment diagram.

32. The method of claim 22, wherein the step of invoking includes invoking the version control system to obtain a working copy of the determined file from a central repository containing a master copy of the source code.

33. The method of claim 32, wherein the step of storing includes restricting the working copy to be read only.

34. The computer-readable medium of claim 22, wherein the version control command comprises acquiring a copy of a most current version of a selected file from a central repository, placing the copy of the file in a working directory on a requesting computer, and preventing others from checking out the file.

35. The method of claim 34, wherein the requesting computer is a client component of the version control system.

36. The method of claim 34, wherein a computer containing the central repository is a server component of the version control system.

37. The computer-readable medium of claim 22, wherein the version control command comprises transferring a copy of a selected file from a working directory on a requesting computer to a central repository.

38. The computer-readable medium of claim 22, wherein the version control command comprises synchronizing a working copy of a selected file with a most current version of the file in a central repository.

39. The computer-readable medium of claim 22, wherein the version control command comprises committing changes made to a working copy of a selected file to a corresponding file on a central repository.

40. A data processing system for managing tiles in a software project with a software development tool containing a version control system, comprising:
 a secondary storage device containing the software project, the software project comprising source code;
 a memory containing the software development tool that displays a graphical diagram and a textual representation of the software project using a language-neutral representation stored in a non-repository transient meta-model,
  wherein changes made to either the diagrammatic or textual displays are automatically used to convert the language-neutral representation and the source code such that the source code and the diagram are synchorized, and wherein the diagram is composed of elements, each element having an associated file containing a portion of the software project, that receives an indication of a selection of one of the diagram elements corresponding to a portion of the software project, that receives a selection of a command performable by the version control system, and that invokes the version control system to perform the selected command on the portion of the software project; and
 a processor for running the software development tool.

41. A data processing system for managing files in a software project with a version control system, comprising:
 a first computer including a memory containing a software development tool, which displays a diagram of the software project with diagram elements, and a client component of the version control system; a secondary storage containing a working directory; and a processor for running the software development tool;
 a second computer including a memory containing a software development tool and a server component of the version control system, a secondary storage containing a central repository, and a processor for running the software development tool; and
 a network connecting the first and second computer;
 wherein the software development tool displays a graphical diagram and a textual representation of the software project using a language-neutral representation of the software project stored in a non-repository transient meta-model such that changes to either the diagrammatic or textual displays will be automatically used by the software development tool to convert the language-neutral representation and source code of the software project simultaneously,
 wherein the diagram of the software project contains diagram elements corresponding to portions of the software project, and
 wherein the software development tool on the first computer receives an indication of a selection of one of the diagram elements that corresponds to a portion of the software project, receives an indication of a command performable by the version control system, and invokes the version control system to perform the selected command on the portion of the software project.

* * * * *

UNITED STATES PATENT AND TRADEMARK OFFICE
CERTIFICATE OF CORRECTION

PATENT NO. : 6,993,759 B2
DATED : January 31, 2006
INVENTOR(S) : Apatus et al.

It is certified that error appears in the above-identified patent and that said Letters Patent is hereby corrected as shown below:

Column 24,
Line 26, replace "Hellojava" with -- Hello.java --.

Column 29,
Line 19, replace "managing tiles" with -- managing files --.

Signed and Sealed this

Eighteenth Day of April, 2006

JON W. DUDAS
*Director of the United States Patent and Trademark Office*